United States Patent [19]

Sklokin et al.

[11] Patent Number: 4,971,692
[45] Date of Patent: Nov. 20, 1990

[54] SETTLER FOR LIQUID-LIQUID EXTRACTORS

[76] Inventors: Leonid I. Sklokin, ulitsa Kozlova, 5, kv. 38.; Vladimir E. Leif, ulitsa Zinovieva, 8, kv. 34; Jury M. Sednev, ulitsa Dzerzhinskogo, 45, kv. 82.; Sofya M. Masloboeva, ulitsa Stroitelei, 4I, kv. 4I.; Vladimir P. Kovalevsky, ulitsa Fersmana, 54, kv. II8.; Boris M. Stefanovich, ulitsa Festivalnaya, I0, kv. 63.; Vladimir T. Kalinnikov, ulitsa Zinovieva, I0, kv. 65., all of Murmanskaya oblast, Apatity; Genrikh V. Korpusov, Leninsky prospekt, 69, korpus 3, kv. 398., Moscow; Vladimir I. Antonov, ulitsa Zhdanova, 8, kv. 9.; Alexandr S. Guryanov, ulitsa Komsomolskava, 8, kv. I., both of Estonskava SSR, Sillamvae; Fedor I. Kozy, Novokuznetsk, prospekt Sovetskoi Armii, 3, kv. 24.; Grigory G. Gostev, Novokuznetsk, prospekt Zapsibovtsev, 96/39, kv. 22., both of Kemerovskava oblast, Novokuznetsk, all of U.S.S.R.

[21] Appl. No.: 283,481
[22] PCT Filed: Feb. 5, 1988
[86] PCT No.: PCT/SU88/00031
    § 371 Date: Oct. 24, 1988
    § 102(e) Date: Oct. 24, 1988
[87] PCT Pub. No.: WO88/06055
    PCT Pub. Date: Aug. 25, 1988

[30] Foreign Application Priority Data

Feb. 18, 1987 [SU] U.S.S.R. ............... 4196871

[51] Int. Cl.$^5$ ................................ C02F 1/40
[52] U.S. Cl. ................... 210/519; 210/521; 210/522; 210/534
[58] Field of Search ............. 210/519, 521, 522, 533, 210/534

[56] References Cited

U.S. PATENT DOCUMENTS

| | | | |
|---|---|---|---|
| 378,495 | 2/1888 | Colles | 210/519 |
| 1,084,132 | 1/1914 | Comstock | 210/534 |
| 1,135,997 | 4/1915 | Dorr | 210/519 |
| 1,176,775 | 3/1916 | Morris | 210/521 |
| 1,960,904 | 5/1934 | Gilchrist | 210/522 |
| 1,968,031 | 7/1934 | Donohue | 210/522 |
| 2,003,357 | 6/1935 | Gilchrist | 210/522 |
| 2,009,510 | 7/1935 | Mobley | 210/521 |
| 3,182,799 | 5/1965 | Krofta | 210/521 |
| 3,820,954 | 6/1974 | Stonner | 210/521 |
| 3,868,335 | 2/1975 | Stonner | 210/522 |

FOREIGN PATENT DOCUMENTS

| | | |
|---|---|---|
| 799781 | 1/1981 | U.S.S.R. . |
| 1131525 | 12/1984 | U.S.S.R. . |
| 1489823 | 10/1977 | United Kingdom . |

Primary Examiner—W. Gary Jones
Assistant Examiner—Christopher Upton
Attorney, Agent, or Firm—Lilling and Lilling

[57] ABSTRACT

An apparatus for separating immiscible liquids of various density is disclosed, comprising a plurality of pan-shaped elements, wherein all walls (6, 7, 8, 9) of each pan-shaped element (5) are inclined outwards. The pan-shaped elements (5) are arranged so that the distance (h) between bases (10) of the adjacent pan-shaped elements (5) is less than the height of their walls (6, 7, 8, 9). Each arrangement for evacuating one of the phases is fashioned as a substantially vertical passage (16) having an inlet (17) flow area greater than the outlet (18) flow area. The passage (16) is arranged so that the walls (20) thereof extend through the base (10) of the pan-shaped elements (5). The outlet (18) of the passage (16) is spaced from the base (10) of the pan-shaped element (5) at a distance greater than the inlet (17) of this passage (16). The passage (16) is provided with a flow control member (19).

9 Claims, 3 Drawing Sheets

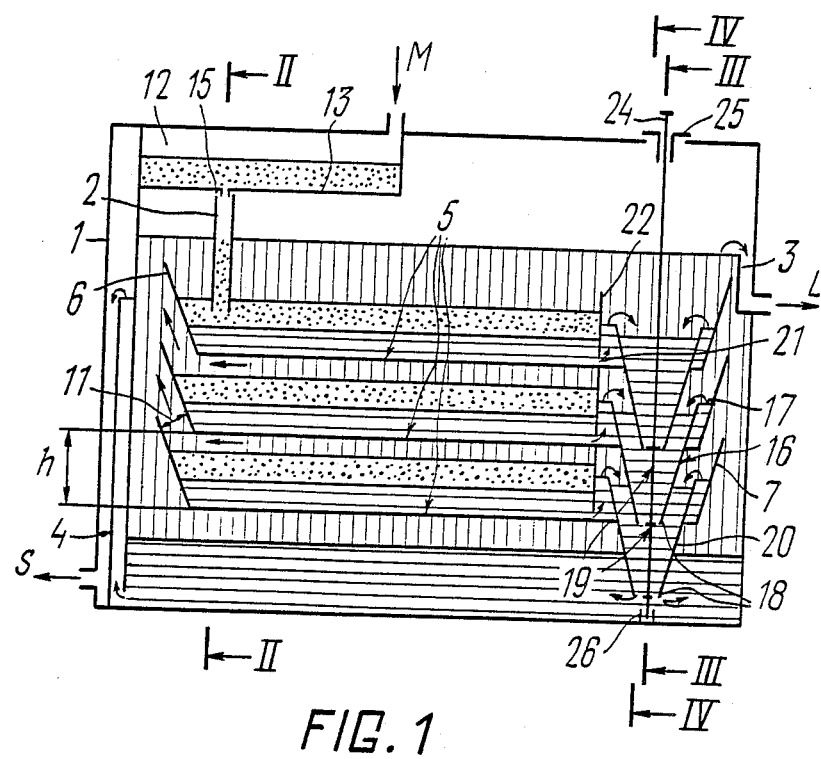
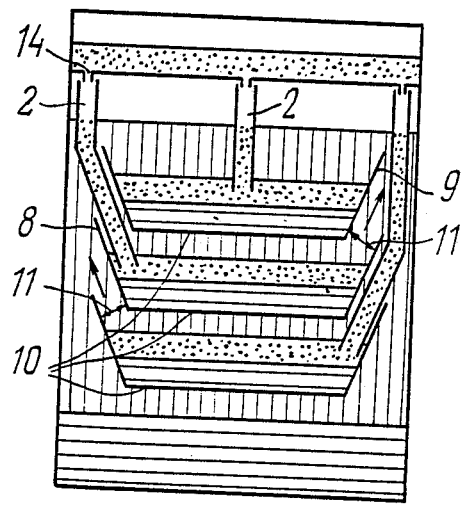
FIG. 1
FIG. 2

SETTLER FOR LIQUID-LIQUID EXTRACTORS

BACKGROUND OF THE INVENTION

1. Field of the Invention

This invention relates to apparatus for separating immiscible liquids of various density, and more particularly concerns a settler for liquid-liquid extractors.

In devices of this type separation of a mixture of phases is done in separation sections immersed in one of the phases.

2. Description of the Prior Art

An increase in the output volume of process solutions necessitates the provision of extraction apparatus having a higher efficiency and smaller mounting area, that is, a higher output capacity per unit volume of the settler.

During the separation of a mixture of phases the efficiency of the process grows as the initial volume of the mixture of phases is separated into layers. The efficiency of separation tends to be higher with the reduction in the height of the layer of the mixture of phases. However, separation in thin layers creates the problem of selecting the optimum ratio between the height of the layer of clean phases and the layer of mixture of phases in the separation section, as well as problems associated with uniform distribution of the mixture of phases in sections and transporting the phases being evacuated from the sections to a common phase boundary.

There is known a settler for liquid-liquid extractors (cf., U.S. Pat. No. 3,868,335) comprising a housing having means for feeding a mixture of phases and evacuating the separated clean phases from the housing. The interior of the housing accommodates separation sections in the form of box-shaped means arranged one above another with a longitudinal and lateral offset, and immersed in one of the phases. Each such box-shaped means has an open top and closed bottom when immersed in the light phase, or a closed top and open bottom when immersed in the heavy phase. It also has four vertical side walls, one of which is provided with a means for feeding a mixture of phases. Arranged in front of this wall is the means for evacuation of one of the phases, whereas provided between this means for evacuation and the wall having the means for feeding the mixture of phases is a partition mounted with a clearance relative to the base or to the top of the arrangement. The settler has a vertical collector of the mixture of phases with the means for feeding the mixture of phases connected to the side wall thereof.

However, this settler suffers from low throughput capacity because the box-shaped means are vertically spaced inside the chamber, and offset longitidinally and laterally, resulting in inefficient utilization of the volume of the settler and, therefore, excessive mounting area. The countercurrent movement of the liquid phase, heavy phase and a mixture of both outside the box-shaped means caused by structural peculiarities of the arrangement for feeding the mixture of phases to the apparatus and evacuating them therefrom also affects the throughput capacity of the settler and results in a larger mounting area.

There is also known a settler for liquid-liquid extractors (cf., U.S. Pat. No. 3,820,954) comprising a housing having a means for feeding a mixture of phases in the form of trays, and a means for evacuating the separated clean phases. Accommodated inside the housing are separation sections in the form of pan-shaped elements arranged in parallel one above another and defining a slot for evacuating one of the phases. Each such element has an open top and closed bottom or open bottom and closed top, and communicates with the means for feeding the mixture of phases. In each pan-shaped means one wall thereof is inclined toward the outside, whereas provided in front of this wall is a means for evacuating one of the phases, inclined toward the inside of the apparatus. Accommodated between the means for evacuating one of the phases and the wall inclined towards the outside is a partition extending from the adjacent pan-shaped means to the phase being evacuated which defines a clearance with the base or top of this pan-shaped means. The settler has a vertical collector of the mixture of phases, a side wall of which is connected to the trays. The distance between the bases of the adjacent pan-shaped means includes the height of the walls and the width of the slot for evacuating one of the phases. The wall which is inclined towards the outside can have a recess to ensure overflow of the mixture of phases.

This settler, however, has an insufficient throughput capacity, on the one hand, because the pan-shaped means are spaced a substantial distance from each other, resulting in excessive height of the chamber. The distance between the bases of the adjacent means, and consequently the thickness of the layers of the mixture of phases and that of the clarified phases is preselected arbitrarily, thereby failing to meet the maximum throughput capacity of the settler. On the other hand, the throughput capacity of the settler is reduced by the countercurrent movement of the separated phases outside the pan-shaped means, especially at the interface between the phases in the settler, where interaction between the phases is of an impact character. Such a movement results in a change in the density of the phase in which these means are immersed, secondary dispersion of the phases, and mutual entrainment of the finely dispersed phases. This in turn necessitates a larger volume of the settler and, accordingly, a larger mounting area.

In addition, the means for feeding the mixture of phases fails to ensure distribution of the mixture of phases in equal volumes necessitating overflow of the mixture of phases from the overlying to underlying pan-shaped means. The provision of a recess in the outwardly inclined wall for ensuring such an overflow can lead to a loss of the phase mixture layer, as the position of the pan-shaped means is deviated from the horizontal. This last disadvantage is especially manifest in the case of employment of elongated pan-shaped means of a limited height.

SUMMARY OF THE INVENTION

It is an object of the invention to provide a settler, for liquid-liquid extractors, having such a construction as to intensify the process of phase separation without increasing the mounting area of the settler.

These objects are attained by a settler for liquid-liquid extractors comprising a housing having means for feeding a mixture of light and heavy phases; means for evacuating the separated light and heavy phases from the housing; pan-shaped means accommodated inside the housing one above another, each communicating with the means for feeding the mixture of phases and defining with the adjacent pan-shaped means a slot for conveying one of the phases to the interior of the housing, each pan-shaped means having one wall thereof inclined toward outside, the means for evacuating one of the phases being disposed in front of this wall at a location remote from this wall, whereas accommodated between the means for evacuating one of the phases and the wall inclined outside, with a clearance relative to a base or platform of the pan-shaped means, is a partition whose plane is substantially perpendicular to the direction of the flow of the phase being evacuated through the clearance, according to the invention, all other walls of the pan-shaped means are also inclined outside, whereas distance between the bases of the adjacent pan-shaped means is less than the vertical height of their walls; each means for evacuating one of the phases has the form of a substantially vertical passage having an inlet flow area greater than an outlet flow area, this passage being provided with a flow control member and arranged so that walls thereof extend through the base of the pan-shaped means, the outlet of the substantially vertical passage being spaced from the base of the pan-shaped means at a distance greater than the distance to the inlet of the verbal passage of the subsequent pan-shaped means;.

The provision in the proposed settler for liquid-liquid extractors of pan-shaped means having all walls thereof inclined toward outside, and the arrangement of these pan-shaped means so that the distance between the bases of the adjacent means is less than the height of their walls affords a distance between the bases corresponding to the maximum throughput capacity of any single pan-shaped means and the settler in general at a preset height thereof.

Fashioning the means for evacuating one of the phases in the form of a substantially vertical passage having an inlet flow area greater than an outlet flow area, as well as the proposed arrangement of the passage and provision therein of a flow control member affords evacuation of the heavy (light) phase from the pan-shaped means without contacting the phase in which the means are immersed, thereby avoiding countercurrent movement of the phases outside these means. This prevents secondary dispersion and mutual entrainment of phases, resulting in a higher throughput capacity of the settler.

Preferably, the settler is provided with a collector of the mixture of phases arranged above the means for evacuating the light phase from the housing, whereas the means for feeding the mixture of phases is connected to a bottom of the collector.

This allows equal volumes of the mixture of phases to be fed to the pan-shaped means' thereby preventing overflow of the mixture of phases from one pan-shaped means to another and stabilizing the operation of any single pan-shaped means and the settler as a whole. Another accompanying advantage resides in elimination of the countercurrent movement between the mixture of phases and the phase in which the pan-shaped means is immersed.

Desirably, the distance "h" between the bases of the adjacent pan-shaped means is determined from the relationship:

$$h = h_m + (kh_m)^2,$$

where
$h_m$ is the height of the layer of mixture of phases in each pan-shaped means, (m); and
$k$ is the empirical coefficient, $(m^{-1})$.

The value of the empirical coefficient "k" depends on the density of the phases, their dynamic viscosity, interphase tension, and diameter of the drops of the dispersed phase. This coefficient is preferably between 3 and 5. The value of the coefficient "k" approaching the lower limit corresponds to easily separable mixtures of phases, and that approaching the upper limit corresponds to mixtures of phases where separation is difficult. In order to ensure high through-put capacity of the settler, the height of the layer of the mixture of phases in the pan-shaped means must exceed 80–100 mm.

The selection of the distance between the bases of the pan-shaped means affords an optimized ratio between the height of the layers of the mixture of phases and separated phases in each such means with the view of attaining the maximum throughput capacity of the settler.

Alternatively, the passage for evacuating one of the phases has the form of a truncated cone.

Such a configuration of the passage allows more effective control of the outlet flow area of each passage, simplifies the arrangement of the pan-shaped means inside the housing, and makes these means less difficult to fabricate.

Advisably, the substantially vertical passages are arranged in the pan-shaped means coaxially along the vertical axis, the walls of the substantially vertical passages of each adjacent pan-shaped means embracing the walls of the substantially vertical passage of the preceding pan-shaped means.

Such an arrangement of the passages allows a coordinated control over the flow area of the outlets of the passages of various pan-shaped means.

Preferably, each flow control member has the form of a disk provided in the outlet of each substantially vertical passage, the outside diameter of each succeeding disk progressively reducing downstream of the flow of the phase being evacuated, all the disks being secured on one vertical rod.

This construction and positioning of the flow control member facilitates evacuation of the heavy (light) phase from all the pan-shaped means to the boundary between the phases in the settler accompanied by an increase in the quantity of the phase being evacuated from one pan-shaped means to another. In addition, in steady operating conditions this affords occupation of the passages with the phase being evacuated, which promotes an increase in the throughput capacity of the settler.

Advisably, the vertical passages of the adjacent pan-shaped means are arranged along parallel vertical axes, every other vertical passage being positioned coaxially.

Such an arrangement of the substantially vertical passages of the adjacent pan-shaped means simplifies their manufacture and assembly, and makes the pan-shaped means more reliable in operation.

Alternatively, each flow control member has the form of a washer secured in the outlet of the substantially vertical passage, the inside diameter of each successive washer progressively increasing downstream of the phase being evacuated.

Alternatively, each flow control member has the form of a cup having holes in the side wall and connected to the outlet of the corresponding substantially vertical passage, each successive cup downstream of the phase being evacuated having one more hole.

This arrangement of the flow control member allows evacuation of the heavy (light) phase from all the pan-shaped means to the boundary between the phases in the settler accompanied by an increase in the quantity of the phase being evacuated from one pan-shaped means to another. In addition, it allows the employment of the flow control member during arrangement of the passages for evacuating the phases both along one and along two vertical axes.

BRIEF DESCRIPTION OF THE DRAWINGS

These and other objects and attending advantages of the invention will become more fully apparent from a preferred embodiment thereof taken in conjunction with the accompanying drawings, in which:

FIG. 1 is a side view of a settler according to the invention with pan-shaped means immersed in a light phase;

FIG. 2 is a section along the line II—II in FIG. 1;

DETAILED DESCRIPTION OF THE PREFERRED EMBODIMENTS OF THE INVENTION

Figure 5:
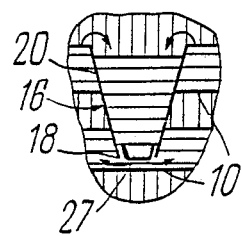
FIG. 5 shows a modified form of the flow control member without a rod'in the form of a washer.

A settler for liquid-liquid extractors comprises a housing 1 (FIG. 1) accommodating means for feeding a mixture M of light and heavy phases in the form of pipes 2 of equal inside diameter, and means 3, 4 for evacuating light and heavy phases L and S, respectively, from the housing 1. The interior of the housing 1 accommodates substantially identical pan-shaped means 5 including walls 6, 7, 8, 9 and a base or platform 10, these means 5 being arranged one above another and immersed in the light phase. The walls 6, 7, 8, 9 of each pan-shaped means 5 are inclined to the outside, whereas the side faces of the walls 6 to 9 of the adjacent means 5 define a slot 11 for evacuating one of the phases from each of the pan-shaped means 5. The means 5 are arranged so that the distance "h" between the bases or platforms 10 of two adjacent means 5 is less than the height of their walls 6, 7, 8, 9.

The distance "h" is preset depending on the capacity of the settler and physical/chemical properties of the phases according to the relationship:

$$h = h_m + (kh_m)^2,$$

where
$h_m$ is the height of the layer of the mixture of phases in the apparatus, (m),
k is the empirical coefficient, (m$^{-\frac{1}{2}}$), and is selected from a range of numbers between 3 and 5.

The width of the slot 11 for evacuating the light phase is preselected to be 0.25–0.5 of "h".

Provided inside the housing 1 is a collector 12 of the mixture M of phases arranged horizontally above the means 3 for evacuating the light phase from the housing 1. A bottom 13 of the collector 12 has identical nozzles 14 (FIG. 2). Each pipe 2 is connected by one end thereof with the bottom 13 through the nozzle 14 which enters the pipe 2 to form a clearance 15 (FIG. 1) therein.

The other end of each pipe 2 communicates with the pan-shaped means 5.

Each means 5 has an arrangement for evacuating one of the phases fashioned as a substantially vertical passage 16 (FIGS. 1 and 3) having a flow area of an inlet 17 substantially greater than the flow area of an outlet 18. Particularly, the vertical passage 16 can have the form of a truncated cone. The vertical passage 16 has a flow control member 19, and is so arranged in the base 10 of the means 5 that walls 20 of the passage 16 extend through the base 10. The outlet 18 of the passage 16 of the means 5 is spaced from its base 10 at a distance greater than the inlet 17 of the passage 16 of the successive means 5 downstream of the flow of heavy phase S being evacuated.

A partition 22 is provided in the means 5 between the wall 6 and passage 16 with a clearance 21 relative to the base 10. The plane of the partition 22 is substantilly perpendicular to the direction of the flow of heavy phase S evacuated through the clearance 21.

The passages 16 are arranged in the pan-shaped means 5 coaxially along the vertical axis so that the walls 20 of the passages 16 of the adjacent means 5 partially overlap.

Figure 3:
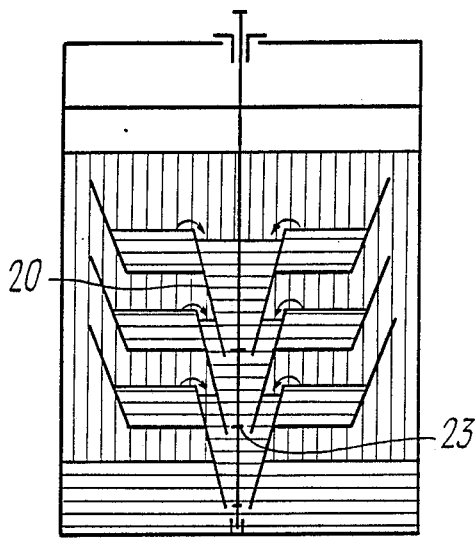
FIG. 3 is a section along the line III—III in FIG. 1.

Each flow control member 19 is fashioned as a disk 23 arranged in the outlet 18 of each passage 16 (FIG. 3). A rod 24 on which the disks 23 are secured has guides 25, 26 and is accommodated in the passages 16 so that the disks 23 rest in the outlets 18 of the passages with a clearance relative to their walls 20. The outer diameter of the disks 23 progressively reduces downstream of the heavy phase S being evacuated.

Figure 4:
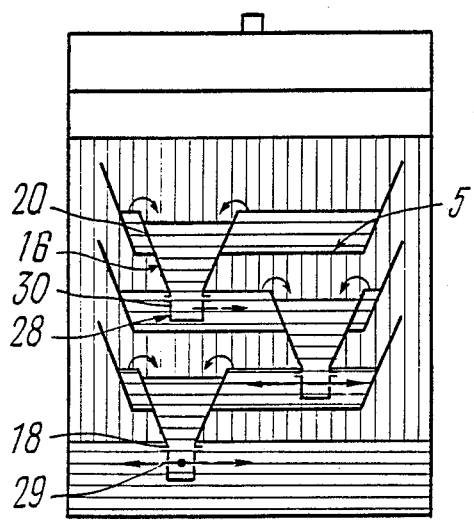
FIG. 4 is a section along the line IV—IV in FIG. 1 showing a modified form of a flow control member'- without a rod'in the form of a cup.

With reference to FIG. 4, the passages 16 are arranged in the pan-shaped means 5 along parallel vertical axes. In this case passages 16 of every other pan-shaped means are coaxial.

Alternatively, the flow control member can have the form of washer 27 (FIG. 5) provided in the outlet 18 of each passage 16. The inside diameter of the washers 27 progressively increases downstream of the flow of heavy phase S.

The flow control member can also be fashioned as a cup 28 (FIG. 4) having holes 29 in a side wall 30. The cup 28 is connected to the outlet 18 of each passage 16. The total flow area of the holes 29 in each cup 28 progressively increases from passage to passage downstream of the heavy phase S being evacuated.

Figure 6:
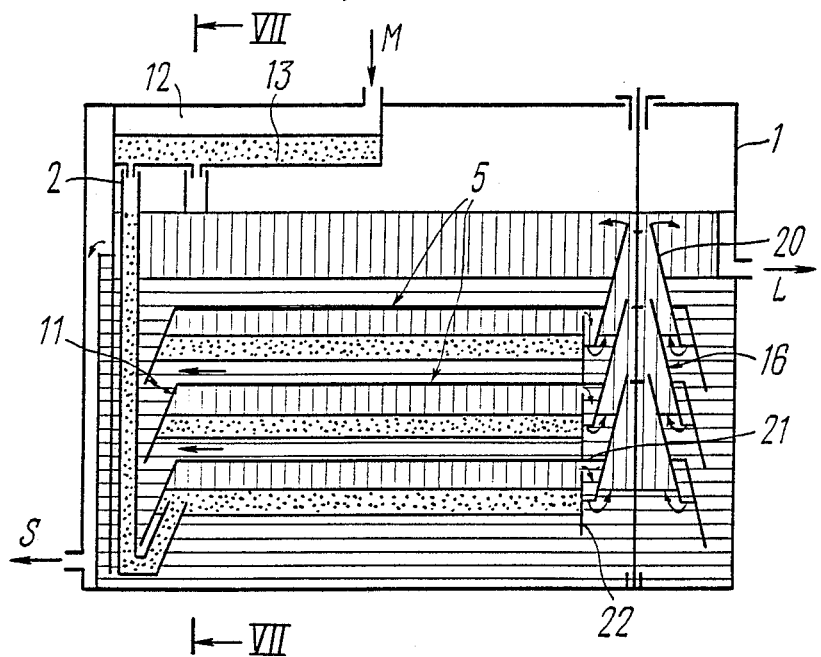
FIG. 6 is a side view of a settler according to the invention with pan-shaped means immersed in a heavy phase.
Figure 7:
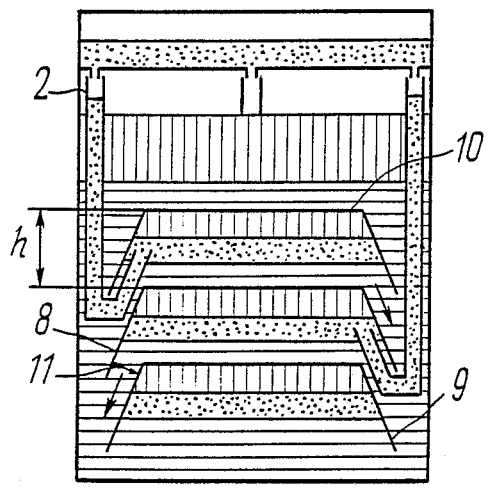
FIG. 7 is a section along the line VII—VII in FIG. 6.

In a modified form of the proposed settler for liquid-liquid extractors illustrated in FIGS. 6 and 7 the pan-shaped means 5 are immersed in the heavy phase S. Here, the construction of the settler is substantially similar to that described above, except that the bases 10 or platforms of the means 5 face the top of the housing 1. The light phase L is conveyed to the interior of the housing 1 through the passages 16.

The proposed settler for liquid-liquid extractors operates in the following manner.

The mixture M of phases to be separated is conveyed from the collector 12 of the mixture of phases (FIGS. 1 to 3) through the nozzles 14 and pipe 2 to each pan-shaped means 5. Equal quantities of the mixture M of phases are admitted to each pan-shaped means 5, at the boundary between the phases and spread into the form of layers. The height $h_m$ of the layer of mixture of phases in each means 5 is invariable under steady-state operating conditions. As the mixture M of phases moves along the means 5, it is separated into light and heavy phases L and S, respectively. The light phase L is conveyed from the means 5 through the slots 11 to the inside of the housing, to the surrounding light phase L. The heavy phase is conveyed through the clearance 21 and inlet 17 to the interior of the passage 16 continuously occupied under steady-state operating conditions by the heavy phase S. The heavy phase S flows through the clearance between the disk 23 and wall 20 of the passage 16 to the interior of the passage 16 of the underlying means 5, etc., until it escapes from the means 5 below the boundary between the phases in the settler to the body of the heavy phase S. The separated heavy phase S leaves the housing 1 through the means 4 for evacuating the heavy phase, whereas the light phase L is evacutated through the means 3.

Referring back to FIG. 4, the passages 16 of the pan-shaped means 5 can be arranged along parallel vertical axes, whereas the flow control member 19 can have the form of a cup 28 with holes 29. In this case the heavy phase flows from the passage 16 of the preceding means 5 through the holes 29 of the cup 28 to the passage 16 (FIG. 1) of the succeeding means 5 through the area of the successive means 5 disposed between the partition 22, and walls 7, 8, and 9. In the steady-state operating conditions this area is continuously filled with the heavy phase S to the level of the inlet 17 of the passage 16.

In the case, when the pan-shaped means 5 (FIGS. 6, 7) are immersed in the heavy phase S, the process proceeds in a similar manner. The heavy phase S is evacuated through the slots 11 of the means 5, and the light phase L is evacuated through the passage 16. The boundary between the phases in the settler rests at the upper part of the housing 1.

The technical essence of the proposed settler for liquid-liquid extractors is hereinafter exemplified by separation of a mixture of phases formed during extraction separation of nitrates of rare-earth elements with tributyl phosphate (FIGS. 1 to 3).

EXAMPLE

Capacity of the settler in terms of the mixture of phases fed to the settler is 10 m³/h at a ratio between the light and heavy phases, L and S, of 1:1.

The ultimate load on the unit area of the pan-shaped means 5 is 2.5 m³/h·m², whereas the value of the empirical coefficient "K" is 4 m$^{-\frac{1}{2}}$. The height $h_m$ of the layer of phase mixture M in the means 5 is 0.06 m.

The distance "h" between the bases 10 of the adjacent means 5 according to this ratio is 0.12 m. The level of liquid in the settler is 2.1 m, whereas the total height of the pan-shaped means 5 is 1.8 m. The number of means 5 is 15. The surface area of the base 10 of single means 5 including the area occupied by the passage 16 is 0.77 m². The overal mounting area of the settler is 0.95 m². The throughput capacity of a single pan-shaped means, and that of a combination of such means is 7.2 m³/h·m², whereas the throughput of the settler is 5 m³/h·m².

As compared with known settlers, the proposed settler makes it possible to reduce the distance "h" between the bases of the adjacent pan-shaped means by a factor of 2.5, increase the throughput capacity of any single pan-shaped means by a factor of 1.8 increased efficiency of the settler by a factor of 2.9. The mounting area of the settler is reduced to one third of the mounting area settlers of the prior art construction.

The invention can be used in the chemical, petrochemical and metallurgical industrial fields for carrying out processes associated with liquid extraction.

The invention can be used most effectively for separating rare-earth elements, non-ferrous metals, and for retrieving ferrous chloride from hydrochloric acid and pickling solutions in metallurgy.

We claim:

1. A settler for liquid-liquid extractors comprising:

a housing, serving to feed a liquid mixture of phases and to evacuate the separated light and heavy phases;

a plurality of pan-shaped means, serving to separate the liquid mixture of phases into light and heavy phases, said pan-shaped means being positioned one above another inside said housing and secured thereto, said pan-shaped means each having walls and a platform, said walls being inclined outwardly and defining a slot between each pair of adjacent walls which serves to evacuate one of the phases inside said housing, the platform of each said pan-shaped means being connected to associated walls and spaced from the platform of a neighboring pan-shaped means by a distance less than the height of said walls;

a first means for feeding the liquid mixture of phases into each pan-shaped means, said first means comprising a collector and a plurality of branch pipes and being attached to the housing, the collector of said first means being positioned above said plurality of pan-shaped means and secured to said housing, said collector having a bottom and a plurality of nozzles fixed in said bottom of said collector, said plurality of branch pipes being connected to said plurality of nozzles so that said nozzles enter said branch pipes forming first clearances said branch pipes being constructed and arranged to feed the mixture of phases to each of said pen-shaped means;

a pipeline secured to said housing and communicating with said collector and a source of the mixture of phases;

a second means for evacuating a separated light phase from said housing, secured to said housing below said bottom of said collector;

a third means for evacuating a separated heavy phase from said housing, secured to said housing;

a fourth means for evacuating one of the phases from each of said plurality of pan-shaped means, said fourth means being made as a substantially vertical passage having an inlet aperture and an outlet aperture, the inlet aperture having an area greater than an area of the outlet aperture, said fourth means being positioned at a point spaced from said branch pipe and secured in the platform of each pan-shaped means, wherein the outlet aperture of the substantially vertical passage of each pan-shaped means is spaced from its platform at a distance greater than the distance of the inlet aperture of the vertical passage of the pan-shaped means immediately downstream of the flow of the phase being evacuated;

a flow control member of said fourth means, positioned inside the substantially vertical passage; and a partition mounted between each branch pipe and each substantially vertical passage and having a second clearance relative to said platform of the pan-shaped means to which said fourth means is secured, wherein the plane of said partition is substantially perpendicular to the direction of flow of one of the phases being evacuated through the second clearance.

2. A settler for liquid-liquid extractors according to claim 1, wherein each substantially vertical passage has a wall which is formed by the generatrix of a truncated cone.

3. A settler for liquid-liquid extractors according to claim 1, wherein the substantially vertical passages of the pan-shaped means are coaxial, wherein said substantially vertical passages have walls, and the wall of the substantially vertical passage of each pan-shaped means embraces the wall of the substantially vertical passage of the pan-shaped means immediately upstream of the flow of the phase being evacuated.

4. A settler for liquid-liquid extractors according to claim 3 wherein each said flow control member is a disc having an outer diameter provided in the outlet aperture of the substantially vertical passage and secured to a vertical rod, wherein the outer diameter of the disc of the substantially vertical passage of each pan-shaped means is less than the outer diameter of the disc of the substantially vertical passage of the pan-shaped means immediately upstream of the flow of the phase being evacuated.

5. A settler for liquid-liquid extractors according to claim 3, wherein each said control member is a washer, having a constant outer diameter and an inner diameter, said washer being mounted in the outlet aperture of the substantially vertical passage, wherein the inner diameter of the washer of the substantially vertical passage of each pan-shaped means is greater than the inner diameter of the washer of the substantially vertical passage of the pan-shaped means immediately upstream of the flow of the phase being evacuated.

6. A settler for liquid-liquid extractors according to claim 3, wherein each said control member is a cup having a side wall, and having holes in the side wall, said holes having a sum area, which cup communicates with the outlet aperture of the substantially vertical passage, wherein the sum area of the holes of the cup of the substantially vertical passage of the pan-shaped means is greater than the sum area of the holes of the cup of the substantially vertical passage of the pan-shaped means immediately upstream of the flow of the phase being evacuated.

7. A settler for liquid-liquid extractors according to claim 1, wherein said substantially vertical passages have axes, and each axis of the substantially vertical passage of the pan-shaped means is parallel to the axis of the substantially vertical passage of the pan-shaped means immediately downstream of the flow of the phase being evacuated, wherein the axis of the substantially vertical passages of the pan-shaped means of said plurality are coaxial through every other pan-shaped means.

8. A settler for liquid-liquid extractors according to claim 7, wherein each said control member is a washer, having a constant outer diameter and an inner diameter, said washer being mounted in the outlet aperture of the substantially vertical passage, wherein the inner diameter of the washer of the substantially vertical passage of each pan-shaped means is greater than the inner diameter of the washer of the substantially vertical passage of the pan-shaped means immediately upstream of the flow of the phase being evacuated.

9. A settler for liquid-liquid extractors according to claim 7, wherein each said control member is a cup having a side wall, and having holes in the side wall, said holes having a sum area, which cup communicates with the outlet aperture of the substantially vertical passage, wherein the sum area of the holes of the cup of the substantially vertical passage of the pan-shaped means is greater than the sum area of the holes of the cup of the substantially vertical passage of the pan-shaped means immediately upstream of the flow of the phase being evacuated.

* * * * *